United States Patent
Sedlacek

(10) Patent No.: US 7,040,480 B2
(45) Date of Patent: May 9, 2006

(54) ZERO BACK PRESSURE CONVEYOR

(75) Inventor: Kyle J. Sedlacek, New Orleans, LA (US)

(73) Assignee: Laitram, L.L.C., Harahan, LA (US)

( * ) Notice: Subject to any disclaimer, the term of this patent is extended or adjusted under 35 U.S.C. 154(b) by 25 days.

(21) Appl. No.: 10/710,528

(22) Filed: Jul. 19, 2004

(65) Prior Publication Data

US 2006/0011453 A1    Jan. 19, 2006

(51) Int. Cl.
*B65G 47/26* (2006.01)
(52) U.S. Cl. .................. 198/457.02; 198/779
(58) Field of Classification Search ............. 198/851, 198/853, 457.02, 833, 779
See application file for complete search history.

(56) References Cited

U.S. PATENT DOCUMENTS

| | | | |
|---|---|---|---|
| 3,653,489 A | 4/1972 | Tullis et al. | |
| 3,679,043 A * | 7/1972 | Becker | 198/457.02 |
| 3,894,627 A | 7/1975 | Jabbusch et al. | |
| 4,262,794 A | 4/1981 | Bourgeois | |
| 4,880,107 A * | 11/1989 | Deal | 198/779 |
| 4,909,380 A * | 3/1990 | Hodlewsky | 198/779 |
| 4,993,540 A | 2/1991 | van Capelleveen | 198/779 |
| 5,082,109 A | 1/1992 | Blondeau | 198/781 |
| 5,224,583 A | 7/1993 | Palmaer et al. | 198/779 |
| 5,238,099 A | 8/1993 | Schroeder et al. | 198/456 |
| 5,404,997 A | 4/1995 | Schreier et al. | 198/779 |
| 5,582,287 A | 12/1996 | Heit et al. | 198/803.01 |
| 5,823,319 A | 10/1998 | Resnick et al. | 198/781.06 |
| 6,062,378 A | 5/2000 | Clopton | 198/867.13 |
| 6,073,747 A | 6/2000 | Takino et al. | 198/370.09 |
| 6,318,544 B1 | 11/2001 | O'Connor et al. | 198/853 |
| 6,494,312 B1 | 12/2002 | Costanzo | 198/779 |
| 6,523,672 B1 | 2/2003 | Greve | 198/459.8 |
| 6,571,937 B1 | 6/2003 | Costanzo et al. | 198/779 |
| 6,758,323 B1 * | 7/2004 | Costanzo | 198/457.02 |
| 2003/0085106 A1 | 5/2003 | Corley et al. | 198/853 |

* cited by examiner

*Primary Examiner*—James R. Bidwell
(74) *Attorney, Agent, or Firm*—James T. Cronvich

(57) ABSTRACT

A conveyor comprising an outer roller-top belt loop and an inner drive belt loop inside the outer belt loop for accurate and smooth control of conveyed articles. Rollers on the outer belt loop extend beyond outer and inner sides of the roller-top belt. The inner drive belt has an outer surface that frictionally contacts the rollers beneath the inner side of the outer belt loop along an article-conveying carryway portion of the conveying path. Relative motion between the two belts causes the drive belt to rotate the rollers it contacts. The outer belt loop and the inner belt loop can be driven at different speeds by separate drives. The relative speeds of the two belts determine the direction and speed of rotation of the rollers.

25 Claims, 2 Drawing Sheets

ZERO BACK PRESSURE CONVEYOR

BACKGROUND OF INVENTION

The invention relates generally to power-driven conveyors and, more particularly, to driven roller-top conveyor belts in which the rollers are themselves driven by a drive belt beneath the roller-top belt along a carryway segment of a conveying path.

Conveyors are used in industrial applications to transport articles from one processing station to another. Often a continuously moving conveyor belt is used to deliver articles to a downstream processing station. As soon as the supply of articles exceeds the handling capacity of the downstream processing station, the articles begin to back up upstream of the processing station. Friction between the conveying surface of the moving belt and the backed-up, or accumulated, articles causes the articles to push against each other. The pressure exerted against the article at the front of the group of accumulated articles is called back line pressure. As more articles back up, the back line pressure increases. Back line pressure can cause damage to the articles, excessively load the conveyor belt and its drive components, and accelerate belt wear. Roller-top belts with freely rotatable rollers in rolling contact with the undersides of conveyed articles are often used to reduce friction and lower back line pressure. But even roller-top belts cannot decrease back line pressure to zero by themselves. Zone accumulation, in which a series of separately driven conveyors can be stopped and started depending on the downstream demand and upstream supply of articles, is used to eliminate back line pressure. But zone accumulation requires multiple drives and sensors, which can be costly, and, between consecutive conveying zones, transfers, at which articles are susceptible to tipping.

Consequently, what is needed is a true zero back pressure conveyor that does not have the article-tipping potential of zone accumulators.

SUMMARY OF INVENTION

This need and other needs are satisfied by a conveyor comprising a conveyor belt loop having rollers driven by a drive belt inside the loop. The conveyor belt forming the loop extends in thickness from an outer side to an inner side. Rollers in the conveyor belt have salient portions that extend beyond the inner and outer sides. The drive belt disposed within the loop of the conveyor belt has an outside surface in frictional contact with the salient portions of the rollers extending beyond the inner side of the conveyor belt along an article-conveying segment of a conveying path. A first drive coupled to the conveyor belt drives the belt along the conveying path in a direction of belt travel at a first speed. A second drive coupled to the drive belt drives the drive belt at a second speed in or opposite to the direction of conveyor belt travel.

In another aspect of the invention, a conveyor comprises an outer belt loop and an inner belt loop. The outer belt loop has embedded rollers protruding past opposite inner and outer sides of the outer belt loop. The inner belt loop has an outer surface that contacts the rollers protruding past the inner side of the outer belt loop along a conveying segment of the outer belt loop. Also provided are means for driving the outer belt loop and the inner belt loop in the same or opposite directions at first and second speeds.

In yet another aspect of the invention, a conveyor comprises a roller-top belt arranged to travel in a first loop and a drive belt arranged to travel in a second loop inside the first loop. The roller-top belt has rollers extending beyond inner and outer sides of the first loop. The drive belt has an outer surface that is positionable into driving contact with the rollers along a portion of the inner side of the first loop.

BRIEF DESCRIPTION OF DRAWINGS

These features and aspects of the invention, as well as its advantages, are better understood by reference to the following description, appended claims, and accompanying drawings, in which:

DETAILED DESCRIPTION

Figure 1:
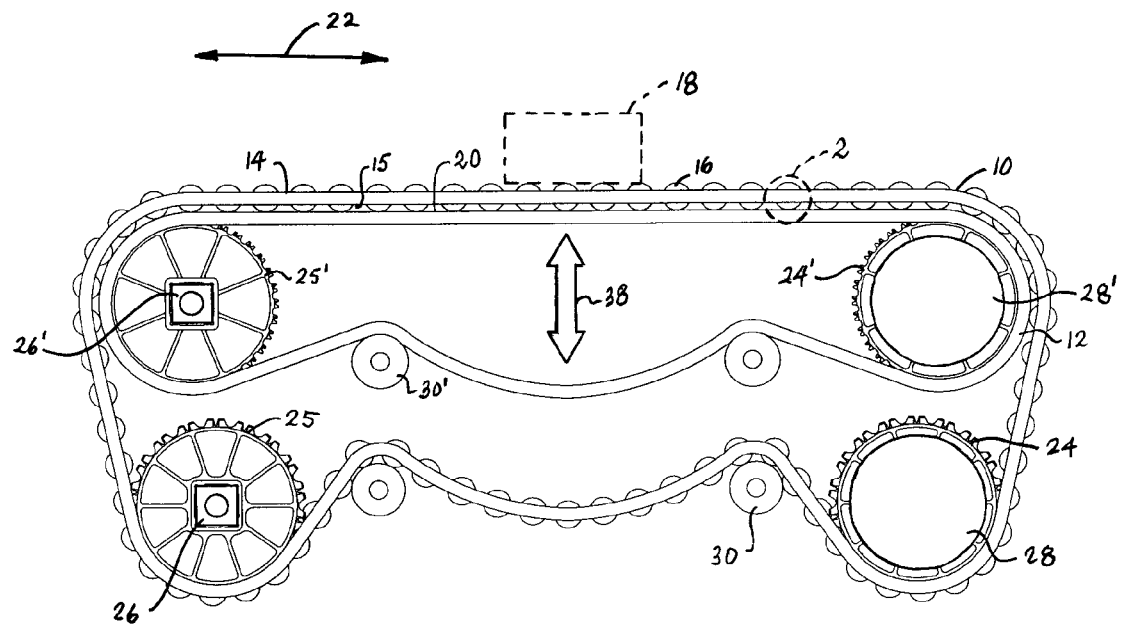
FIG. 1 is a side elevation schematic view of a conveyor embodying features of the invention.
Figure 2:
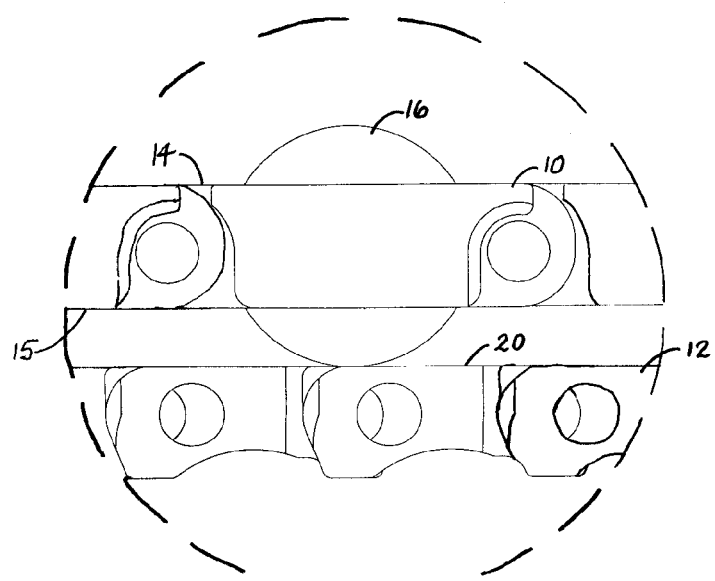
FIG. 2 is an enlarged view of a portion of the conveyor of FIG. 1.
Figure 3:
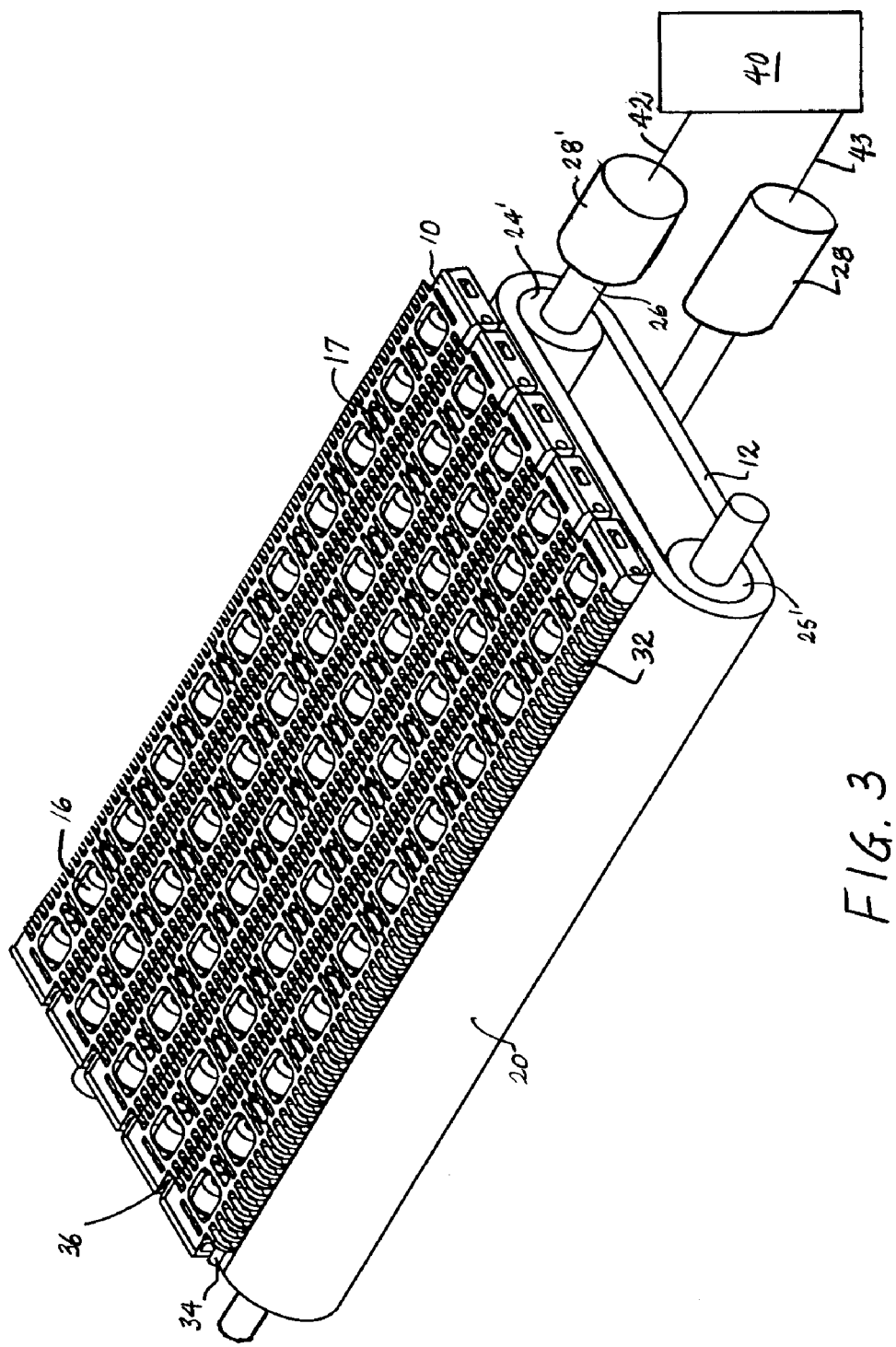
FIG. 3 is a combination schematic diagram and isometric view of a portion of the conveyor of FIG. 1.

One version of a conveyor embodying features of the invention is shown in FIGS. 1–3. The conveyor includes a roller-top belt 10 arranged in a first loop and a second belt 12 arranged in a second loop inside the first loop. The roller-top belt extends in thickness from an outer side 14 to an inner side 15. Rollers 16 embedded in the roller-top belt protrude beyond the inner and outer sides of the belt. Articles 18 conveyed on the outer belt loop are supported on salient portions of the rollers extending past the outer side of the belt on an article-conveying carryway segment (the top horizontal segment of the outer loop in FIG. 1) of the conveying path. Along the article-conveying segment, the roller-top belt is itself supported on the outer surface 20 of the inner belt 12. The outer surface contacts salient portions of the rollers extending below the inner side 15 of the roller-top belt.

The roller-top belt is driven in a direction of belt travel 22, which may be bidirectional, by a first drive that includes one or more drive sprockets 24 (or a drive drum) mounted on shafts 26 and a motor 28, including a gear box if necessary, coupled to the drive shaft via a conventional coupling. Teeth on the sprocket periphery engage drive structure on the inner side of the roller-top belt. The shaft is rotatably supported in shaft bearings at both ends in the conventional way. Usually the drive shaft for the roller-top belt is at one end of the conveying path. Idler sprockets 25 on a shaft 26 at the other end of the conveying path help form the loop and define the conveying path. Return rollers 30 or shoes in the return path eliminate belt sag and further define the conveying path along the returnway.

The inner drive belt 12 is similarly driven by a drive that includes sprockets 24' mounted on shafts 26' driven by a motor 28'. The drive belt loop also includes idler sprockets 25' at the end of the loop opposite the drive and return rollers 30' along its returnway. The two drives constitute means for driving the outer belt loop and the inner belt loop in the same direction or in opposite directions at first and second speeds.

Although the belts could be rubber belts with the sprocket drives replaced by pulley drives at each end, they are preferably modular plastic conveyor belts, such as those manufactured and sold by Intralox, L.L.C. of Harahan, La., USA. Modular plastic belts are constructed of consecutive rows of one or more plastic belt modules typically injected molded out of a thermoplastic polymer, such as polypropylene, polyethylene, acetal, and composite materials. Individual modules are arranged in rows, usually in a bricklay pattern with the modules of other rows. As shown in FIG. 3, hinge eyes 32 along the leading and trailing ends of a row interleave with the hinge eyes of trailing and leading rows. A hinge pin 34 installed in the lateral passageway formed through the interleaved hinge eyes of adjacent rows connects the rows together at a hinge joint 36 at which the belt can articulate about a sprocket, drum, shoe, or pulley. One example of the conveyor using modular plastic conveyor belts is best shown in FIG. 2, in which the outer belt 10 is a roller-top belt such as the Intralox Series 400 Roller Top belt, in which cylindrical rollers rotate about axles 17 transverse to the direction of belt travel. The inner belt 12 is an Intralox Series 1100 Flat Top belt. The outer surface 20 of the drive belt 12 rotates the rollers 16 of the roller-top belt as long as the two belts are driven at different speeds. The frictional contact between the drive belt and the rollers can be increased by making at least the outer portion of the roller out of a high-friction material, such as urethane or a thermoplastic elastomer. Alternatively, the outer surface of the inner belt can be made of or coated with a high-friction material, such as in a flat friction-top modular conveyor belt.

In operation, the two-belt conveyor system can provide true zero back line pressure accumulation. If the roller-top belt is driven at a first speed (for example, to the left in FIG. 1) and the inner belt is lowered out of contact with the rollers, as indicated by arrow 38, an article 18 is carried to the left along with the belt because the rollers are not rotating. If the article is prevented from advancing to the left in FIG. 1 by a gate, a back-up of articles, or other obstruction, the roller-top belt will continue to run; the rollers will rotate under the blocked articles as the belt advances in a low, but not zero, back line pressure condition. If the inner, drive belt 12 is moved upward as indicated by arrow 38 into a position contacting the innerside rollers of the outer belt loop and driven in the same direction as the outer belt loop, but at twice the speed, the articles will remain stationary in a true zero back line pressure condition. With the drive belt advancing linearly at twice the speed of the roller-top belt, even a lone article on the roller-top belt will remain generally stationary.

Besides providing low, or even zero, back line pressure, the conveyor can operate in other ways. For example, if the inner belt remains stationary, the rollers on the outer belt loop will rotate, by contact with the outer surface of the stationary inner belt, in the forward direction as the outer belt advances. The forward rotation of the rollers causes conveyed articles to accelerate and move along faster than the linear advance of the belt itself. Thus, the conveyor can be used to achieve separation between consecutive articles. Of course, if the inner, drive belt is driven in a direction opposite to the outer belt, the rollers rotate faster and the articles are propelled forward at even greater speeds. And, driving the inner belt at a speed greater than twice the speed of the roller-top belt and in the same direction will cause articles atop the rollers to move in a reverse direction opposite to the direction of travel of the roller-top belt.

As previously described, the action of the drive belt on the rollers can be disabled by moving it out of contact with the roller-top belt. Another way in which the action of the belt may be disabled is by driving both belts in the same direction at the same speed. With no relative motion between the two belts, the inner belt will not rotate the rollers. Those are two ways of idling the rollers.

As shown in FIG. 3, the two belts are preferably driven by separate drive motors 28, 28'. Although the two drives can be independent, at least one is preferably adjustable. A controller 40, such as a programmable logic controller or a general purpose or custom computer, is used to control the relative speeds of the two belts. Signal and control lines 42, 43 to each drive allow the controller to monitor operating conditions and control the speeds of the two belts. In this way, the speeds of both can be controlled dynamically or the speed of one can be adjusted relative to the known or measured speed of the other, as in a master-slave relationship, for example. In a simpler version, a single motor may be used to drive one of the belts at a first speed, with the second belt slave-driven by chain reduction, for instance, to achieve a desired speed differential between the two belts.

Thus the invention provides a conveyor that can achieve accurate article control by reversing, accelerating, and decelerating conveyed articles smoothly, as well as provide zero back line pressure.

The invention has been described in detail with respect to a preferred version and some variations of that version. But other versions and variations are possible without departing from the invention. For example, the rollers could be spherical roller balls instead of cylindrical rollers on axles. As another example, series of inner belt loops could be consecutively positioned inside the outer loop of a longer roller-top belt to form individual accumulation zones along the article-conveying carryway segment of the conveying path. So, as these few examples suggest, the scope of the invention is not meant to be limited to the details of the specific versions described.

What is claimed is:

1. A conveyor comprising:
 a conveyor belt in the form of a loop and extending in thickness from an outer side to an inner side, the conveyor belt including rollers having salient portions extending beyond the inner and outer sides of the conveyor belt;
 a first drive coupled to the conveyor belt to drive the conveyor belt along a conveying path in a direction of belt travel at a first speed;
 a drive belt disposed within the loop of the conveyor belt and having an outside surface in frictional contact with the salient portions of the rollers extending beyond the inner side of the conveyor belt along an article-conveying segment of the conveying path;
 a second drive coupled to the drive belt to drive the drive belt in or opposite to the direction of belt travel at a second speed.

2. A conveyor as in claim 1 wherein the first speed and the second speed are adjustable.

3. A conveyor as in claim 1 wherein the first speed and the second speed are different speeds.

4. A conveyor as in claim 1 wherein the second speed is greater than the first speed.

5. A conveyor as in claim 1 wherein the second speed is twice the first speed.

6. A conveyor as in claim 1 wherein the second speed is zero.

7. A conveyor as in claim 1 wherein the second drive may be idled to disable the driving of the drive belt.

8. A conveyor as in claim 1 wherein the second speed varies as a function of the first speed.

9. A conveyor as in claim 1 wherein the conveyor belt comprises a roller-top modular conveyor belt.

10. A conveyor as in claim 1 wherein the drive belt comprises a flat friction-top modular conveyor belt.

11. A conveyor comprising:
 an outer belt loop having embedded rollers protruding from the outer belt loop past opposite inner and outer sides of the outer belt loop;

an inner belt loop disposed inside the outer belt loop and having an outer surface contacting the rollers protruding past the inner side of the outer belt loop along a conveying segment of the outer belt loop;

means for driving the outer belt loop and the inner belt loop in the same direction or in opposite directions at first and second speeds.

12. A conveyor as in claim 11 wherein the means for driving includes a first drive for driving the outer belt loop at the first speed and a second drive for driving the inner belt loop at the second speed.

13. A conveyor as in claim 12 wherein the second drive may be idled to disable the driving of the rollers in the outer belt.

14. A conveyor as in claim 11 wherein the means for driving includes a first drive for driving the outer belt loop at the first speed and a second drive for driving the inner belt loop at the second speed in the same direction as the outer belt loop.

15. A conveyor as in claim 11 wherein the first speed and the second speed are adjustable.

16. A conveyor as in claim 11 wherein the first speed and the second speed are different speeds.

17. A conveyor as in claim 11 wherein the second speed is greater than the first speed.

18. A conveyor as in claim 11 wherein the second speed is twice the first speed.

19. A conveyor as in claim 11 wherein the second speed varies as a function of the first speed.

20. A conveyor as in claim 11 wherein the outer belt comprises a roller-top modular conveyor belt.

21. A conveyor as in claim 11 wherein the inner belt comprises a flat friction-top modular conveyor belt.

22. A conveyor comprising:

a roller-top belt arranged to travel in a first loop in a first direction of belt travel and having rollers extending beyond inner and outer sides of the first loop formed by the roller-top belt;

a drive belt arranged to travel in a second loop inside the first loop in or opposite to the first direction of belt travel and having an outer surface positionable into driving contact with the rollers of the roller-top belt along a portion of the inner side of the first loop.

23. A conveyor as in claim 22 wherein the roller-top belt includes axles about which the rollers rotate.

24. A conveyor as in claim 22 wherein the rollers are made of a high-friction material.

25. A conveyor as in claim 22 wherein the outer surface of the drive belt is a high-friction material.

* * * * *